UNITED STATES PATENT OFFICE.

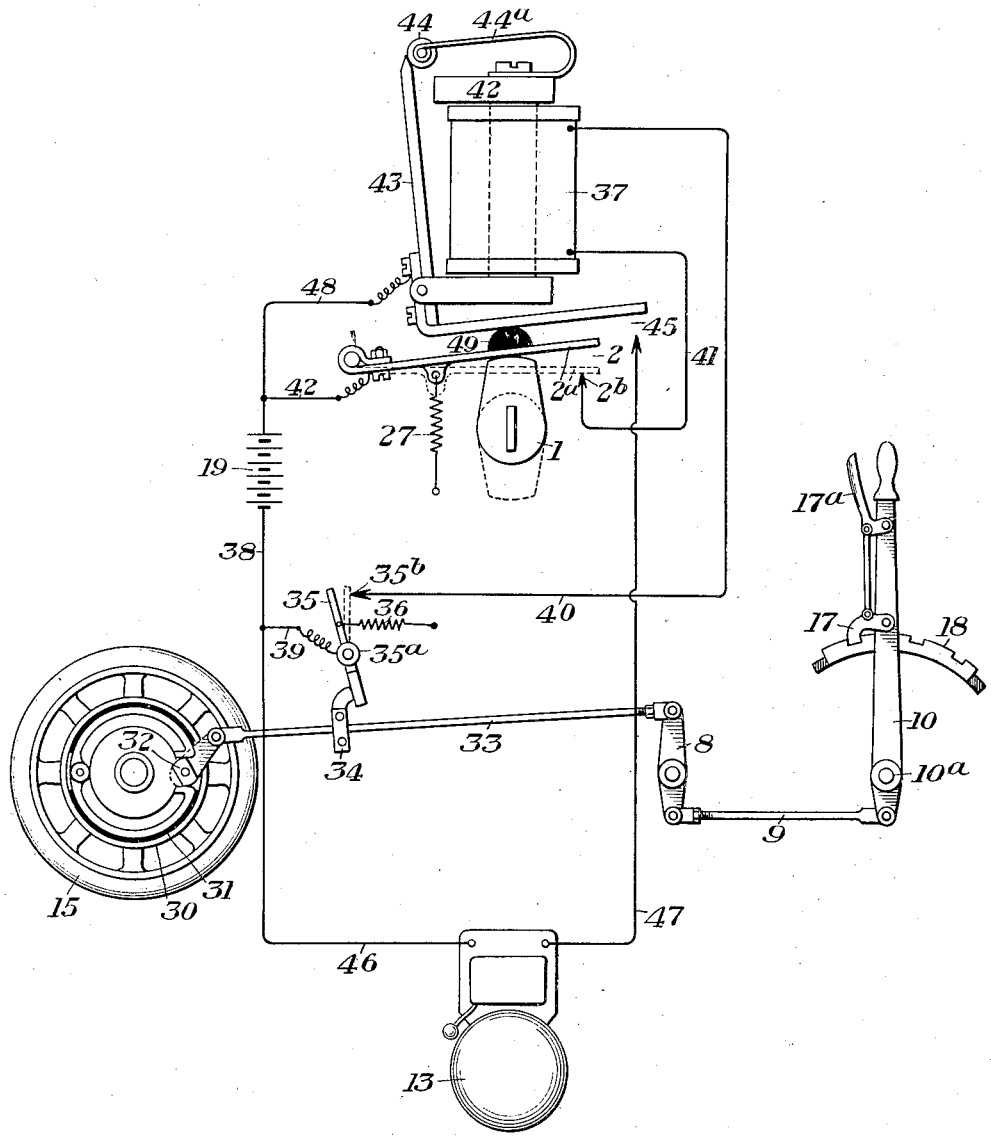

BRUNO ZABEL, OF EDGEWOOD BOROUGH, PENNSYLVANIA.

AUTOMOBILE WARNING DEVICE.

1,295,950.     Specification of Letters Patent.     Patented Mar. 4, 1919.

Original application filed September 5, 1916, Serial No. 118,325. Divided and this application filed August 3, 1917. Serial No. 184.227.

*To all whom it may concern:*

Be it known that I, BRUNO ZABEL, a citizen of the United States, residing at Edgewood borough, in the county of Allegheny and State of Pennsylvania, have invented certain new and useful Improvements in Automobile Warning Devices, of which the following is a specification.

My invention relates to automobiles and other vehicles, and particularly to means for detecting the use thereof or tampering therewith by unauthorized persons.

The present application is a division of my application filed September 5, 1916, Serial No. 118,325, for automobile warning devices, on which Letters Patent No. 1,236,526 were granted on August 14, 1917.

I will describe one form of apparatus embodying my invention and will then point out the novel features thereof in claim.

The accompanying drawing is a view, partly diagrammatic, showing one form of apparatus embodying my invention.

Referring to the drawing, I have here shown an automobile comprising a rear wheel 15. Attached to this wheel is the usual brake drum 30, within which is located a brake band 31, which band is controlled in the usual manner by a cam 32. This cam is operatively connected with the usual brake lever 10 through the medium of links 9 and 33, the lever 10 being pivoted at 10$^a$ to the framework of the car. The lever 10 is provided as usual with a dog 17 which is controlled by a latch 17$^a$ and which coacts with a fixed segment 18 having notches adapted to receive the dog. It is understood that with the lever 10 in the position shown in the drawing the brake is partially applied; to release the brake the lever 10 is swung to the left to such position that the dog 17 passes off of the segment 18. The lever 10 may be swung to the right from the position shown to cause a more forcible application of the brake.

Fixed to the link 33 is a member 34 which controls a contact finger 35 pivotally mounted at 35$^a$. This contact finger is biased by a spring 36 to such position that it engages with a fixed contact 35$^b$, and it is permitted to assume this engaging position when the brake is fully released. As soon as a partial application of the brake occurs, however, member 34 moves to the right and swings contact finger 35 out of engagement with contact 35$^b$, as shown in the drawing. This contact 35 controls a relay 37, the circuit including a contact 2 which is controlled by a lock 1. The circuit for relay 4 is from battery 19, through wires 38 and 39, contact 35, wire 40, relay 37, wire 41, contact 2, wire 42 to battery 19. It will be seen, therefore, that relay 37 will be energized whenever contact 2 is closed and the brake is released. Relay 37 comprises a pole piece 42 which controls an armature 43 and which armature in turn operates a contact 45, this contact being open only when the relay is deënergized. This contact 45 controls the circuit for a warning signal 13 which, as here shown, is a bell. This circuit is from battery 19, through wires 38 and 46, bell 13, wire 47, contact 45, wire 48 to battery 19. With the parts thus far described, it will be obvious that when contact 2 is closed and the brake is released, relay 37 will be energized, thus closing contact 45, so that the warning signal 13 is operated. In order to cause the signal to continue to operate if the brake is reapplied, I provide a device for latching armature 43 in the closed position. This advice, as here shown, comprises a roller 44 carried by a spring 44$^a$, which is attached to the relay 37. Roller 44 coacts with the end of armature 43 in such manner as to permit this armature to close in response to energization of the relay 37 but to prevent the armature returning to its open position upon subsequent deënergization of the relay.

The operation of the apparatus is as follows: While the automobile is running the brake is, of course, released so that contact 35 is closed, but contact 2 is held open by lock 1 so that relay 37 is not energized. The bell is therefore silent. When the automobile is brought to rest the brake is first applied, thus closing contact 35, and the lock 1 is then turned to allow contact 2 to close. The key is then removed so that contact 2 cannot again be opened except by the insertion of the proper key. If now an unauthorized person attempts to start the automobile, the brake is first necessarily released, thus closing contact 35, whereupon relay 37 closes and the bell 13 rings, calling attention of persons in the vicinity that the automobile is being tampered with by an unauthorized person. Owing to the roller 44, the bell continues to ring even if the brake is re-applied, hence the unauthorized person cannot silence the bell after discovering that the automobile is protected by my warning apparatus. The bell may be silenced by operating the lock 1 to open the contact 2, because the movable member of this contact is provided with a block 49 which, when the contact is opened, swings armature 43 to the open position and so opens contact 45 which controls the signal.

It will, of course, be understood that the parts of contact 2 and also the entire relay 37, including the parts of contact 45, are inclosed so that they cannot be tampered with.

Although I have herein shown and described only one form of apparatus embodying my invention, it is understood that changes and modifications may be made therein without departing from the spirit and scope of my invention.

Having thus described my invention, what I claim is:

In combination, a vehicle having a brake, a relay on said vehicle, a warning signal controlled by said relay and operated when the armature of the relay is in attracted position, a contact controlled by said brake device and closed only when the brake is released, a second contact, a circuit for said relay including said two contacts in series and a source of current, means associated with said relay for keeping said armature in the attracted position after it has been moved there by the closing of said relay circuit even though the circuit be subsequently opened by re-application of the brake, and manually operable means for simultaneously opening said second contact and forcing said armature out of attracted position.

In testimony whereof I affix my signature in presence of two witnesses.

BRUNO ZABEL.

Witnesses:
A. H. LESER,
TILLIE LIEB.